(12) United States Patent
Parikh

(10) Patent No.: US 7,830,101 B2
(45) Date of Patent: Nov. 9, 2010

(54) REGULATION OF ELECTRICAL CURRENT THROUGH A RESISTIVE LOAD

(75) Inventor: Parag Parikh, Allentown, PA (US)

(73) Assignee: Agere Systems, Inc., Allentown, PA (US)

( * ) Notice: Subject to any disclaimer, the term of this patent is extended or adjusted under 35 U.S.C. 154(b) by 508 days.

(21) Appl. No.: 11/916,713

(22) PCT Filed: Jun. 12, 2006

(86) PCT No.: PCT/US2006/022709

§ 371 (c)(1),
(2), (4) Date: Dec. 6, 2007

(87) PCT Pub. No.: WO2006/135836

PCT Pub. Date: Dec. 21, 2006

(65) Prior Publication Data

US 2008/0218100 A1    Sep. 11, 2008

Related U.S. Application Data

(60) Provisional application No. 60/689,310, filed on Jun. 10, 2005.

(51) Int. Cl.
*H05B 37/02* (2006.01)
(52) U.S. Cl. .................. 315/307; 315/224; 315/247
(58) Field of Classification Search ............. 315/185 R, 315/209 R, 224–226, 247, 287, 291, 294, 315/297, 299, 306–308, 312; 323/277, 282, 323/283, 287; 363/21.09, 21.12
See application file for complete search history.

(56) References Cited

U.S. PATENT DOCUMENTS

| 5,477,127 | A | 12/1995 | Shiojima et al. ............ 320/138 |
| 5,592,070 | A | 1/1997 | Mino ........................ 320/35 |
| 5,623,195 | A | 4/1997 | Bullock et al. ............. 320/153 |
| 6,285,139 | B1 * | 9/2001 | Ghanem .................... 315/291 |
| 6,320,330 | B1 * | 11/2001 | Haavisto et al. ............ 315/291 |
| 7,057,359 | B2 * | 6/2006 | Hung et al. ................. 315/291 |

(Continued)

FOREIGN PATENT DOCUMENTS

EP        0 409 214 A2    1/1991

(Continued)

*Primary Examiner*—Douglas W Owens
*Assistant Examiner*—Tung X Le
(74) *Attorney, Agent, or Firm*—Mendelsohn, Drucker & Associates, P.C.; Edward J. Meisarosh; Steve Mendelsohn

(57) ABSTRACT

In one embodiment, an electrical system having an LED array, a first current source connected to provide a first current to the LED array, a current-sense resistor connected to the LED array, a second current source connected to provide a second current to the current-sense resistor, a control processor, and a voltage sensor adapted to provide a corresponding sensor signal to the control processor, wherein the control processor is adapted to control the first and second current sources based on the sensor signal. The first current source having a diode with first and second sides, an inductor connected between a first reference voltage source and a first side of a diode, a capacitor connected between a second side of the diode and a second reference voltage, and a transistor connected between the first side of the diode and the second reference voltage.

25 Claims, 4 Drawing Sheets

U.S. PATENT DOCUMENTS

| | | | |
|---|---|---|---|
| 7,525,291 B1 | 4/2009 | Ferguson | 320/164 |
| 2003/0179529 A1 | 9/2003 | Huang et al. | 361/93.8 |
| 2004/0251854 A1* | 12/2004 | Matsuda et al. | 315/291 |
| 2005/0093488 A1 | 5/2005 | Hung et al. | 315/307 |
| 2005/0253634 A1 | 11/2005 | Wu | 327/157 |
| 2007/0285031 A1* | 12/2007 | Shteynberg et al. | 315/294 |
| 2008/0136350 A1* | 6/2008 | Tripathi et al. | 315/294 |

FOREIGN PATENT DOCUMENTS

| | | |
|---|---|---|
| EP | 1 434 328 A2 | 6/2004 |
| EP | 1 691 583 A2 | 8/2006 |
| WO | WO 2005/022957 A1 | 3/2005 |

* cited by examiner

100

200

REGULATION OF ELECTRICAL CURRENT THROUGH A RESISTIVE LOAD

This application claims the benefit of the filing date of U.S. provisional application No. 60/689,310, filed on Jun. 10, 2005, the teachings of which are incorporated herein by reference.

BACKGROUND OF THE INVENTION

1. Field of the Invention

The current invention relates to drivers for resistive loads, and in particular to drivers that control the brightness of a liquid crystal display (LCD) backlight system by regulating the electrical current through an LED array.

2. Description of the Related Art

A growing number of electronic devices use LCDs to provide information to the user. LCDs work, generally, by permitting or preventing light from passing through electrically controlled "portholes." Three categories of LCD displays are reflective, transmissive, and transflective. The light necessary for the LCD display to be visible can be provided by reflected ambient light, as in reflective LCD displays. In many situations, particularly where ambient light is meager, it is advantageous to provide a backlight for the LCD, as in transmissive and transflective LCDs, to make the display easier to read.

Transmissive LCDs, such as LCD computer monitors, are only used with a backlight. Transflective LCDs, such as those used on many popular portable audio devices, can be used either with a backlight (as in a transmissive LCD) or with reflected ambient light (as in a reflective LCD display). One type of backlight for transmissive displays (as used herein, the term includes transflective LCDs in transmissive mode) is based on an array of light emitting diodes (LEDs).

The brightness of a transmissive display that uses an LED-array backlight can be varied by controlling the amount of current flowing through the LEDs. The higher the current, the brighter the transmissive display appears. In order to control the current through the LEDs, a feedback loop is typically used. The feedback loop includes a current-sense resistor, i.e., a resistor of relatively low resistance connected, on one end, to a device of interest, e.g., the LED array, and, on the other end, to a common node (e.g., ground), wherein the voltage across the resistor is indicative of the current through it and thus through the device of interest. This method is considered sufficiently reliable for current values down to the tens of milliamps. However, prior-art backlight drivers do not reliably detect smaller electrical currents, such as those measured in microamps, since smaller voltages are more difficult to accurately detect.

SUMMARY OF THE INVENTION

In one embodiment, the present invention is an electrical system comprising (i) a resistive load, (ii) a first current source connected to provide a first current to the resistive load, (iii) a current-sense resistor connected to the resistive load, (iv) a second current source connected to provide a second current to the current-sense resistor such that the current passing through the current-sense resistor is the sum of the first and second currents, (v) a control processor, and (vi) a voltage sensor adapted to sense the voltage across the current-sense resistor and provide a sensor signal to the control processor, wherein the control processor is adapted to control the first and second current sources based on the sensor signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
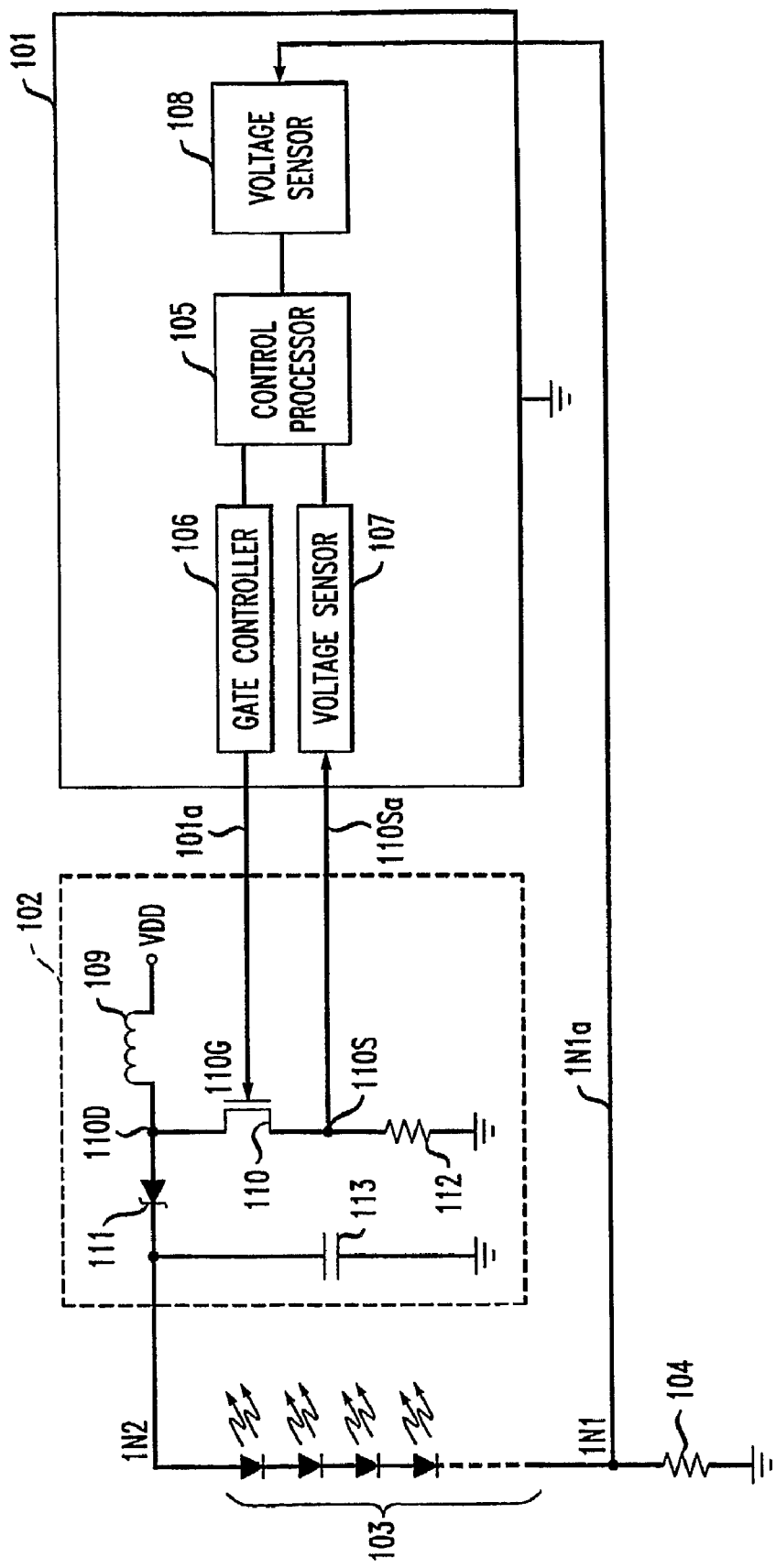
FIG. 1 shows a simplified block diagram of an LCD backlight system with a backlight control unit.

FIG. 1 shows LCD backlight system 100 with backlight control block 101, which regulates the current flowing through LED array 103 and thereby the brightness of the LCD backlight and the corresponding display. Control block 101 comprises control processor 105, gate controller 106, and voltage sensors 107 and 108. Control processor 105, which controls the operations of control block 101, regulates the current flowing through LED array 103 by using gate controller 106 to regulate the duty cycle of flyback current source 102. Control processor 105 receives feedback about the current through LED array 103 via voltage sensor 108, which measures the voltage across current-sense resistor 104, which in turn indicates the current flowing through both current-sense resistor 104 and LED array 103.

The current through current-sense resistor 104, and thus through LED array 103, is determined by measuring the voltage drop across current-sense resistor 104 and using Ohm's law, i.e., $I=V/R$, where I is the current, V is the measured voltage, and R is the resistance. Thus, the value of the current, in amperes, through current-sense resistor 104, and thus through LED array 103, is equal to the value of the voltage across current-sense resistor 104, in volts, divided by the value of the resistance of current-sense resistor 104, in ohms.

Control processor 105 controls the duty cycle of flyback current source 102 by having gate controller 106 generate and vary a periodic and substantially rectangular waveform, signal 101*a*, wherein each cycle of the waveform consists substantially of an "on" (i.e., high) period and an "off" (i.e., low) period, and wherein the duty cycle is substantially the ratio of the on period to the off period. Thus, for example, if the duty cycle is 50%, then the waveform is substantially a square wave. If the current through LED block 103 needs to be increased, then control processor 105 increases the duty cycle of flyback current source 102, and if the current through LED block 103 needs to be reduced, then control processor 105 decreases the duty cycle of flyback current source 102. As the duty cycle is varied, the frequency of the generated waveform stays substantially the same. Preferably, the maximum duty cycle used is around 80% since a greater duty cycle would route excessive current to ground causing waste and potential overheating.

Flyback current source 102 comprises inductor 109, n-type transistor 110, zener diode 111, current-sense resistor 112, and capacitor 113. Inductor 109 is connected between voltage source $V_{DD}$ and drain node 110D of transistor 110, which also connects to the p-side of zener diode 111. Current-sense resistor 112 is connected between ground and source node 110S of transistor 110. Zener diode 111 is connected between node 110D and node 1N2, with the p-side of zener diode 111 connected to 110D and the n-side connected to 1N2. Capacitor 113 is connected between node 1N2 and ground. Gate node 110G of transistor 110 is controlled by signal 110a provided by gate controller 106.

When transistor 110 is turned on, current flows from $V_{DD}$ to ground via inductor 109, transistor 110, and current-sense resistor 112. No significant current flows through zener diode 111. Current may flow through LED array 103 if capacitor 113 is sufficiently charged. Control processor 105 uses voltage sensor 107 to determine the voltage drop across current-sense resistor 112. Using Ohm's law, that voltage drop indicates the current flowing through current-sense resistor 112, and thus through transistor 110. Thus, the value of the current through transistor 110 is equal to the value of the voltage across current-sense resistor 112 divided by the value of the resistance of current-sense resistor 112. The voltage across current-sense resistor 112 is equal to the voltage at node 110S, as measured by voltage sensor 107 via path 110Sa. Sensing the current through transistor 110 provides information about the current through transistor 110 and helps control processor 105 reduce circuit ringing, if that becomes a problem.

When transistor 110 is turned off, the voltage at node 110D increases and current flows through zener diode 111 to node 1N2. Zener diode 111 helps prevent that current from flowing back to node 110D, thus helping to keep charge on capacitor 113. A regular diode may be used instead of Zener diode 111, however a zener diode generally has a lower leakage current under reverse bias in its operating range than a comparable regular diode. Some of the charge at 1N2 is stored in capacitor 113 and some flows as current through LED array 103 to node 1N1, and then through current-sense resistor 104 to ground. Only negligible, if any, current flows out of node 1N1 via path 1N1a since that path connects to a high-impendence input of voltage sensor 108, as is typically used for voltage sensing. The rate of current flow through LED array 103 controls the brightness of the LEDs therein, and thereby the brightness of the LCD display.

The current through LED array 103 is substantially identical to the current through current-sense resistor 104, whose value is determined by measuring the voltage drop across current-sense resistor 104. Control processor 105 uses voltage sensor 108 to determine the voltage across current-sense resistor 104. Using Ohm's law, that voltage indicates the current through both current-sense resistor 104 and LED array 103. The current through LED array 103 determines the brightness of its LEDs. Current-sense resistor 104, as is typical for current-sense resistors, is chosen to have a low resistance, such as 10 ohms, in order to reduce the influence of current-sense resistor 104 on the circuit, and a relatively tight tolerance, such as 0.5%, in order to minimize variance and error in determining the current. However, as the current through current-sense resistor 104 gets smaller, so does the voltage at node 1N1. Smaller voltages are more difficult to measure accurately.

Figure 2:
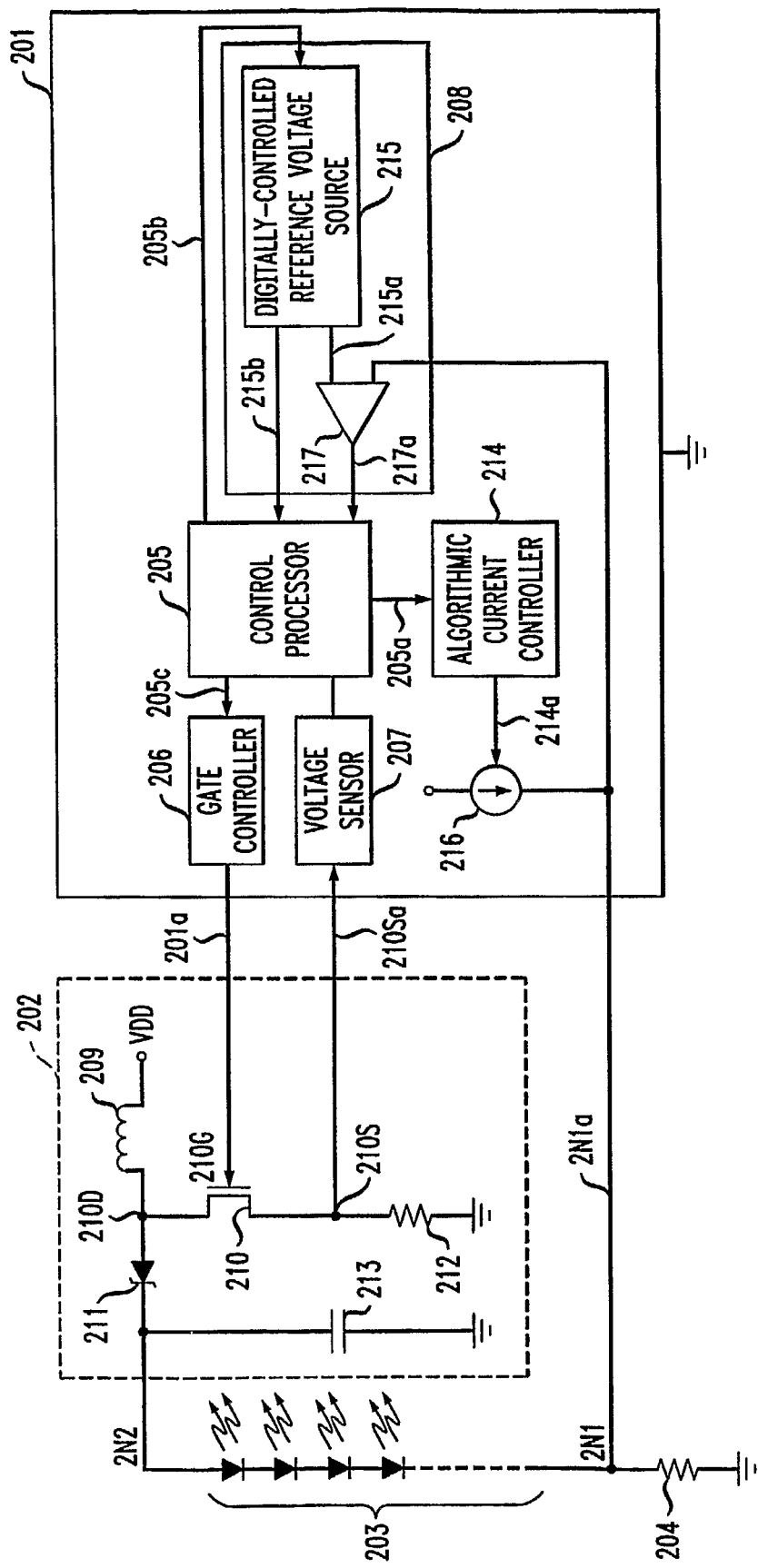
FIG. 2 shows a simplified block diagram of an LCD backlight system with a backlight control unit in accordance with an embodiment of the current invention.

FIG. 2 shows a simplified block diagram of an implementation of LCD backlight system 200 in accordance with an embodiment of the current invention. LCD backlight system 200 is similar to LCD backlight system 100, and components of system 200 are labeled similarly to corresponding components of system 100, but with a different prefix. LCD backlight system 200 comprises control block 201, flyback current source 202, LED array 203, and current-sense resistor 204.

Control block 201 controls the current flowing through, and thus the brightness of, LED array 203 by regulating flyback current source 202 and receiving appropriate feedback. Control block 201 comprises voltage sensors 207 and 208, algorithmic current controller 214, current source 216, and gate controller 206. Voltage sensor 208 comprises comparator 217 and digitally-controlled reference voltage source 215. Control block 201 controls the brightness of the LCD display by regulating the current flowing through LED array 203, which is achieved by regulating the duty cycle of flyback current source 202.

When transistor 210 is turned on, current flows from $V_{DD}$ to ground via inductor 209, transistor 210, and resistor 212. Only negligible, if any, current flows out of node 2N1 through path 2N1a since that path connects to a high-impendence input of comparator 217 and to the output of current source 216, neither of which accepts a significant amount of current, if any. If control block 201 is operating in a steady-state mode, as in one implementation, described below, then current source 216 is not providing any current, and therefore the current through current-sense resistor 204 is substantially equal to the current through LED array 203. If control block 201 is operating in a calibration mode, as in one implementation, described below, then current source 216 is providing a current, and therefore the current through current-sense resistor 204 is substantially equal to the sum of the current through LED array 203 and the current provided by current source 216.

Control block 201 enters a calibration mode if, for example, (i) the LCD backlight system is started up, (ii) the LCD backlight system is reset, (iii) the user indicates a different brightness intensity is desired, or (iv) control processor 205 otherwise determines that a particular brightness level is needed. The calibration process is fast, typically lasting a small fraction of a second. Following calibration, the LCD backlight system enters steady-state mode which lasts indefinitely until some terminating event, such as shut-down or new calibration.

Calibration mode is used to set $I_D$, a particular desired current flow through LED array 203. Calibration relies on digitally-controlled reference voltage source 215 and on current source 216, which is preferably a high-precision current source. Current source 216 is controlled by control processor 205 via algorithmic current controller 214. If control processor 205 determines that calibration should take place, then it directs algorithmic current controller 214, via signal 205a, to set $I_C$, the current provided by current source 216, to precisely the desired current value, $I_D$. Algorithmic current controller 214 controls current source 216 via signal 214a. Control processor 205 instructs algorithmic current controller 214 to have current source 216 provide a particular current or modify the current provided by current source 216 by a certain amount. In response, algorithmic current controller 214 adjusts the current provided by current source 216 in accordance with the settings of algorithmic current controller 214. The current provided by current source 216 goes to node 2N1 and through current-sense resistor 204. At the initial calibration, which follows start up, no current yet flows through LED array 203, and thus the only current through current-sense resistor 204 is $I_C$, the current provided by current source 216. The current through current-sense resistor 204 produces voltage $V_C$ at node 2N1.

The next step is voltage trimming of digitally-controlled reference voltage source 215. $V_C$ remains substantially constant during voltage trimming. Voltage trimming is used to empirically set the precise voltage that digitally-controlled reference voltage source 215 should provide, thereby helping to overcome offsets and variances in voltage source 215 and/or current-sense resistor 204. Digitally-controlled reference voltage source 215 is adapted to provide a range of voltages, at the direction of control processor 205 via signal 205$b$. Control processor 205 may optionally receive feedback from digitally-controlled reference voltage source 215 via signal 215$b$. Control processor 205 sets voltage source 215 to a reference voltage, $V_S$, equal to a programmed value for the resistance of 204 multiplied by the value of $I_D$, the resulting product being close to $V_C$.

Comparator 217 is used to compare reference voltage $V_S$, provided by voltage source 215 via signal 215$a$, to voltage $V_C$, provided to comparator 217 via path 2N1$a$. The output of comparator 217 is provided to control processor 205 via signal 217$a$. If $V_S$ is greater than $V_C$, then the output of comparator 217 is low, and control processor 205 lowers $V_S$ until the output of comparator 217 is high, i.e., until $V_C$ is greater than $V_S$, thereby completing one trimming segment. If $V_C$ is greater than $V_S$, then the output of comparator 217 is high, and control processor 205 raises $V_S$ until the output of comparator 217 is low, i.e., until $V_S$ is greater than $V_C$, thereby completing one trimming segment. Voltage trimming can comprise one, two, or more trimming segments. Additional trimming segments are particularly useful if smaller voltage increments are used in each subsequent trimming segment. The process of voltage trimming can bring reference voltage $V_S$ as close to voltage $V_C$ as the resolution of voltage source 215 will allow.

Next, flyback current source 202 is powered up under the control of control processor 205 via gate controller 206 and signals 201$a$ and 205$c$, while the current provided by current source 216 is incrementally reduced to zero. Control processor 205 continues to operate so as to cause output 217$a$ of comparator 217 to flip back and forth, thus keeping $V_C$ close to $V_S$, but now doing so by varying the current provided by flyback current source 202, which varies $V_C$, rather than by varying $V_S$, the voltage provided by reference voltage source 215. In the power-up phase, $V_S$, which has been set, remains constant while $V_C$ may vary. As the current $I_C$ provided by current source 216 is incrementally reduced from $I_D$ to zero, the current $I_A$ through LED array 203 is incrementally brought up from zero to $I_D$, in a process regulated by control processor 205 with feedback through comparator 217. Following every incremental decrease in $I_C$, $V_C$, the voltage at node 2N1, declines correspondingly. Control processor 205 operates to raise the current provided by flyback current source 202 until $V_C$ is higher than $V_S$, as indicated by comparator 217. At that point, $I_C$ is incrementally reduced again, and the cycle repeats until $I_C$ is brought down to zero. At this point $I_A$, the current through LED array 203, is substantially equal to $I_D$.

Now LCD backlight system 200 enters steady-state mode. Steady-state mode is used after calibration in order to keep the desired current flowing through LED array 203, thus maintaining the brightness of the LCD backlit display. Control processor 205 may continue to vary the current provided by flyback current source 202 so as to keep flipping output 217$a$ of comparator 217, thereby keeping $I_A$ close to $I_D$.

To power down LCD backlight system 200, a related process is used, whereby the current provided by current source 216 is incrementally raised, thereby forcing control processor 205 to reduce $I_A$, the current provided by flyback current source 202, until the current through LED array 203 is zero. Then control processor 205 can ignore the output of comparator 217 and shut off current source 216.

The methods described above for powering up and powering down LCD backlight system 200 can also be used in adjusting the current through LED array 203 from one steady-state level to another steady-state level. If a higher steady state current through LED array 203 is desired, then control processor 205 directs current source 216 to provide the desired current increment, and then performs voltage trimming of voltage source 215, as described above, to set a new reference voltage $V_S$. Control processor 205 then reduces $I_C$ to zero while increasing $I_A$ to maintain $V_C$ substantially equal to $V_S$. Steady-state operation then follows. Alternatively, control processor 205 can increase $I_A$ by raising $V_S$, without using current source 216.

Figure 4:
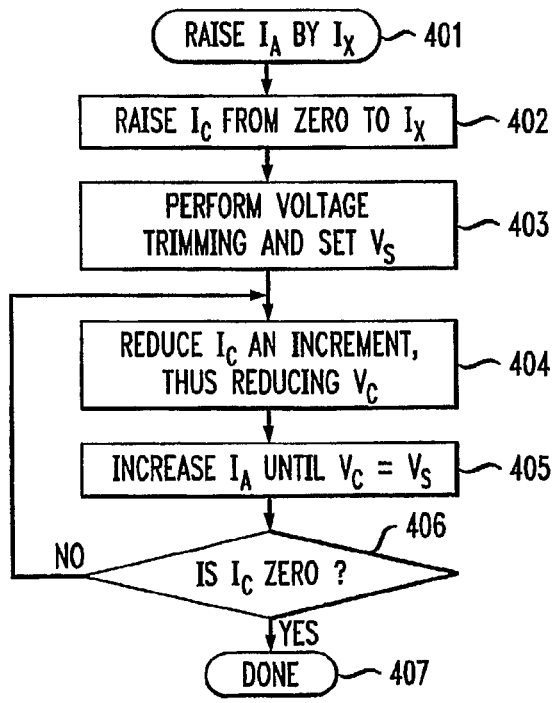
FIG. 4 shows an exemplary flowchart for the operation of LCD backlight system 200 of FIG. 2 in raising the current through LED array 203 of FIG. 2.

FIG. 4 shows an exemplary flowchart for the operation of LCD backlight system 200 of FIG. 2 in raising the current through LED array 203 of FIG. 2. If control processor 205 is required to raise $I_A$ by some amount $I_X$ (step 401), then control processor 205 raises $I_C$ from zero to $I_X$ (step 402). Next, control processor 205 performs voltage trimming of voltage source 215 to set $V_S$, as described above (step 403). After step 403 is complete, control processor 205 reduces $I_C$ by an increment, which reduces $V_C$ (step 404). $I_C$ is not brought below zero in this process. Control processor 205 raises $I_A$ until control processor 205 determines that $V_C$ equals $V_S$ (step 405), as described above. If the reduction in step 404 brought $I_C$ down to zero (step 406), then the procedure is done (step 407). If $I_C$ is still above zero (step 406), then the procedure returns to step 404.

If a lower $I_A$, i.e., current through LED array 203, is desired, then control processor 205 directs current source 216 to provide the magnitude of the desired current increment. As $I_C$ is incremented, control processor 205 reduces $I_A$, to maintain $V_C$ substantially equal to $V_S$, based on feedback from comparator 217, as described elsewhere herein. After $I_C$ is at the desired magnitude, control processor 205 reduces $I_C$ to zero, and performs voltage trimming of voltage source 215, thereby setting a new $V_S$ value for the new reduced value of $I_A$. Then LCD backlight system 200 enters steady-state mode. Alternatively, control processor 205 can lower $I_A$ by reducing $V_S$, without using current source 216.

Figure 5:
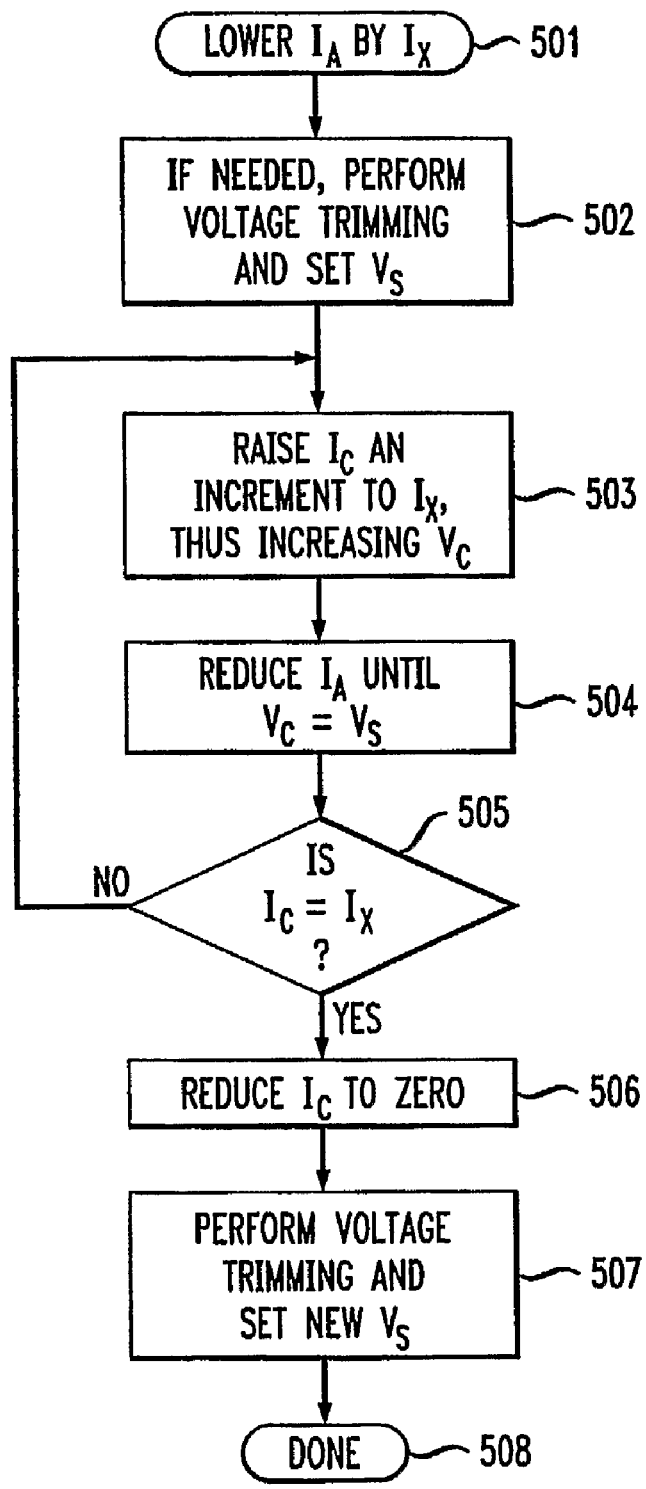
FIG. 5 shows an exemplary flowchart for the operation of LCD backlight system 200 of FIG. 2 in lowering the current through LED array 203 of FIG. 2.

FIG. 5 shows an exemplary flowchart for the operation of LCD backlight system 200 of FIG. 2 in lowering the current through LED array 203 of FIG. 2. If control processor 205 is required to lower $I_A$ by some amount $I_X$ (step 501), then, if $V_S$ is not already set, control processor 205 performs voltage trimming of voltage source 215 to set $V_S$ to be substantially equal to $V_C$ (step 502). Control processor 205 raises $I_C$ by an increment, which raises $V_C$ (step 503). Step 503 does not raise $I_C$ above $I_X$. Next, control processor 205 reduces $I_A$ until control processor 205 determines that $V_C$ is equal to $V_S$ (step 504), as described above. If the increase in step 503 did not bring $I_C$ up to $I_X$ (step 505), then the process returns to step 503. If the increase in step 503 did bring $I_C$ up to $I_X$ (step 505), then control processor 205 reduces $I_C$ down to zero (step 506). Next, control processor 205 performs voltage trimming of reference voltage source 215 and sets a new $V_S$ (step 507), as described above. After step 507, the process is complete (step 508). If LED array 203 is turning off, i.e., if $I_X$ equals $I_A$, then there is no need to perform the voltage trimming of step 507.

In an alternative implementation of the reduction of $I_A$, after $I_C$ reaches the desired magnitude, current source 216 continues providing $I_C$ at the desired magnitude. In the same or another alternative implementation, current source 216 provides current at an initial level other than zero amperes at the start of calibration or raising or lowering the current through LED array 203. These implementations may require modifications to the processes described, as would be appreciated by a person of ordinary skill in the art.

Control processor 205 can direct algorithmic current controller 214 to vary the current provided by current source 216 at any rate, which may be varied, thus allowing for the modification of the current through LED array 203 at variable rates. This allows for increasing and decreasing the brightness provided by LCD backlight display system 200 at, for example, logarithmic rates, which may be more pleasing to the human eye than linear variations in brightness.

Figure 3:
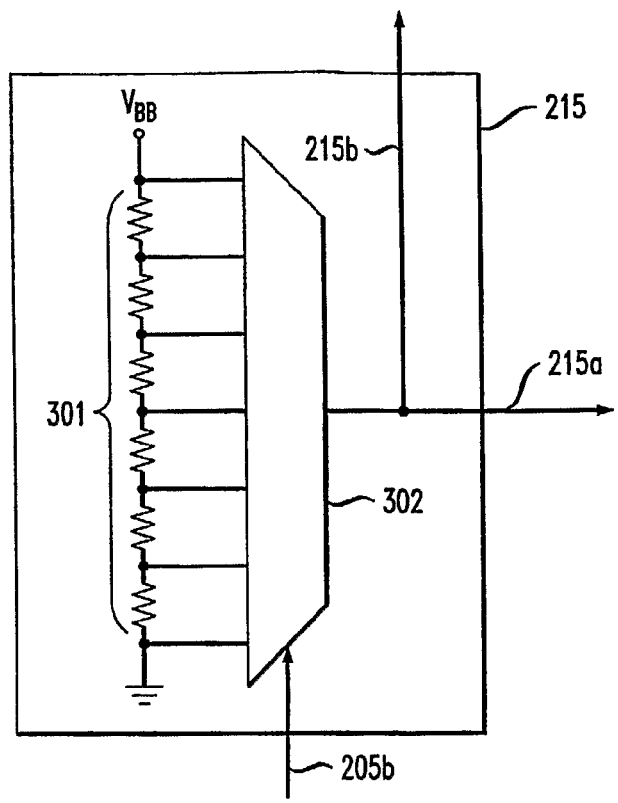
FIG. 3 shows a simplified block diagram of an implementation of digitally-controlled reference voltage source 215 of FIG. 2.

FIG. 3 shows a simplified block diagram of an implementation of digitally-controlled reference voltage source 215 of FIG. 2. Voltage source 215, in this implementation, operates as a multiple-ratio, digitally-selectable, voltage divider. Voltage source 215 comprises resistor array 301 and multiplexer (mux) 302. Voltage source $V_{BB}$ provides a voltage near the maximum voltage to be provided by voltage source 215. The inputs of mux 302 go to the nodes between the resistors of resistor array 301. Alternatively, a continuous resistor 301 may be used, with the inputs of mux 302 going to regularly interspersed locations on continuous resistor 301. Signal 205b selects the desired input of mux 302 making the output voltage equal to a fraction of the voltage level of voltage source $V_{BB}$, as is known in the art. That output voltage is provided on signal 215a and optional signal 215b, In an alternative implementation of voltage trimming, control processor 205 slightly varies $I_C$, the current provided by current source 216, to determine which available voltage level of voltage source 215 is closer to $V_C$, thereby potentially reducing quantizing error in the process described above, and setting a $V_S$ value closer to the value of $V_C$ during voltage trimming.

In the same or another alternative implementation of voltage trimming, control processor 205 initially sets the voltage provided by voltage source 215, to any value in its available range. The output of comparator 217 then indicates to control processor 205 whether the voltage provided by voltage source 215 should be raised or lowered to flip output 217a. After the first flip of output 217a, the voltage trimming process continues as described above. This alternative implementation may increase the time for voltage trimming, but avoids tracking the desired current, the resistance of resistor 204, and multiplying the two values.

In an alternative implementation, voltage sensor 208 comprises components and uses procedures different from those particularly described above for determining the voltage across voltage sense resistor 204.

In an alternative implementation, inverses of described components may be used, with inversions in the logic, as necessary and as would be appreciated by one of ordinary skill in the art, to produce the same results as described above.

In an alternative implementation, in place of the flyback current source described above, any suitable current source whose current level can be controlled by modifying the duty cycle of a control signal, such as signal 201a, may be used to provide power to the LED array.

The present invention has been described with an LED array as the resistive load powered by the flyback current source. However, the invention is not limited to LED arrays and any suitable resistive load may be used.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. An electrical system comprising:
   a resistive load;
   a first current source connected to provide a first current to the resistive load;
   a current-sense resistor connected to the resistive load;
   a second current source connected to provide a second current to the current-sense resistor such that the current passing through the current-sense resistor is the sum of the first and second currents;
a control processor; and
a voltage sensor adapted to sense the voltage across the current-sense resistor and provide a sensor signal to the control processor, wherein the control processor is adapted to control the first and second current sources based on the sensor signal.

2. The invention of claim 1, wherein:
the second current source is adapted to provide an initial current level; and
the control processor is adapted to raise the first current by a specified current increase by:
raising the second current by the specified current increase;
setting a reference voltage substantially equal to the voltage across the current-sense resistor;
reducing the second current until the second current is substantially equal to the initial current level; and
raising the first current until the voltage across the current-sense resistor is substantially equal to the reference voltage.

3. The invention of claim 2, wherein the initial current level is zero amperes.

4. The invention of claim 2, wherein the setting of the reference voltage involves performing voltage trimming of the voltage sensor.

5. The invention of claim 1, wherein:
the second current source is adapted to provide an initial current level; and
the control processor is adapted to lower the first current by a specified current decrease by:
raising the second current until the second current is substantially equal to the sum of the initial current level and the magnitude of the specified current decrease; and
reducing the first current until the voltage across the current-sense resistor is substantially equal to a previously set reference voltage.

6. The invention of claim 5, wherein the control processor is adapted to set the reference voltage substantially equal to the voltage across the current-sense resistor before raising the second current.

7. The invention of claim 5, wherein the setting of the reference voltage involves performing voltage trimming of the voltage sensor.

8. The invention of claim 5, wherein, after reducing the first current, the control processor reduces the second current to the initial current level, and then sets the reference voltage equal to the voltage across the current-sense resistor.

9. The invention of claim 5, wherein the initial current level is zero amperes.

10. The invention of claim 1, wherein the first current source is a flyback current source comprising:
a diode having a first side and a second side;
an inductor connected between a first reference voltage and the first side of the diode;
a capacitor connected between the second side of the diode and a second reference voltage; and
a transistor connected between the first side of the diode and the second reference voltage, wherein the control processor is adapted to control a gate voltage applied to the transistor to control the generation of the first current by the first current source.

11. The invention of claim 10, wherein the diode is a zener diode.

12. The invention of claim 1, wherein the voltage sensor comprises:
a comparator having first and second inputs and an output; and
a reference voltage source having a voltage control input and a reference voltage output, wherein:
a voltage-sensing node corresponds to an interconnection between the resistive load, the current-sense resistor, and the second current source;
the first comparator input is connected to the voltage-sensing node;
the second comparator input is connected to the reference voltage output;
the comparator output is connected to provide the sensor signal to the control processor; and
the control processor is adapted to select, via the voltage control input, the voltage provided by the reference voltage source at the reference voltage output.

13. The invention of claim 12, wherein the reference voltage source comprises:
a series of resistors connected between a third reference voltage and the second reference voltage; and
a multiplexer having multiple inputs and an output, wherein:
the multiplexer inputs are connected to nodes between the resistors;
the multiplexer output is the output of the reference voltage source; and
the multiplexer is adapted to be controlled by the control processor via the voltage control input.

14. The invention of claim 12, wherein the reference voltage source is digitally controlled by the control processor.

15. The invention of claim 1, wherein the control processor regulates the second current source via an algorithmic current controller.

16. The invention of claim 1, wherein the resistive load comprises one or more light-emitting diodes (LEDs), whose brightness depends on the current through the one or more LEDs.

17. A method for raising a first current through a resistive load by a specified current increase, the method comprising:
(a) providing a second current at an initial current level to a current-sense resistor connected to the resistive load and adapted to sense the sum of the first and second currents;
(b) raising the second current by the specified current increase;
(c) setting a reference voltage substantially equal to the voltage across the current-sense resistor;
(d) reducing the second current until the second current is substantially equal to the initial current level; and
(e) raising the first current until the voltage across the current-sense resistor is substantially equal to the reference voltage.

18. The method of claim 17, further comprising:
sensing the voltage across the current-sense resistor;
comparing the sensed voltage to the reference voltage; and
adjusting the reference voltage based on the comparison.

19. A method for lowering a first current through a resistive load by a specified current decrease, the method comprising:
(a) providing a second current at an initial current level to a current-sense resistor connected to the resistive load and adapted to sense the sum of the first and second currents;
(b) raising the second current by the magnitude of the specified current decrease; and (c) lowering the first current until the voltage across the current-sense resistor is substantially equal to a previously set reference voltage.

20. The method of claim 19, further comprising setting the reference voltage substantially equal to the voltage across the current-sense resistor prior to raising the second current.

21. The method of claim 19, further comprising, after lowering the first current:
   (d) reducing the second current to the initial current level; and
   (e) setting the reference voltage equal to the voltage across the current-sense resistor.

22. The method of claim 21, further comprising:
   sensing the voltage across the current-sense resistor;
   comparing the sensed voltage to the reference voltage; and
   adjusting the reference voltage based on the comparison.

23. Apparatus comprising:
   means for providing a first current through a resistive load;
   means for providing a second current at least an initial current level to a means for sensing the sum of the first and second currents;
   means for controlling the first and second currents; and
   means for sensing the voltage across the means for sensing the sum of the first and second currents, and for providing a sensor signal to the controlling means, wherein the controlling means controls the first and second currents based on the sensor signal.

24. Apparatus for raising a first current through a resistive load by a specified current increase, the apparatus comprising:
   (a) means for providing a second current at an initial current level to a current-sense resistor connected to the resistive load and adapted to sense the sum of the first and second currents;
   (b) means for raising the second current by the specified current increase;
   (c) means for setting a reference voltage substantially equal to the voltage across the current-sense resistor;
   (d) means for reducing the second current until the second current is substantially equal to the initial current level; and
   (e) means for raising the first current until the voltage across the current-sense resistor is substantially equal to the reference voltage.

25. Apparatus for lowering a first current through a resistive load by a specified current decrease, the apparatus comprising:
   (a) means for providing a second current at an initial current level to a current-sense resistor connected to the resistive load and adapted to sense the sum of the first and second currents;
   (b) means for raising the second current by the magnitude of the specified current decrease; and
   (c) means for lowering the first current until the voltage across the current-sense resistor is substantially equal to a previously set reference voltage.

* * * * *